United States Patent Office 3,558,350
Patented Jan. 26, 1971

3,558,350
METHOD OF FORMING A COMPOSITE OF BORON FIBERS AND POLYIMIDE
John K. Fincke, Spring Valley, Ralph E. DeBrunner, Kettering, and Glenn R. Wilson, Dayton, Ohio, assignors to Monsanto Research Corporation, St. Louis, Mo., a corporation of Delaware
No Drawing. Continuation of application Ser. No. 593,743, Nov. 14, 1966. This application Sept. 8, 1969, Ser. No. 856,919
Int. Cl. B32b 15/08, 27/34; D04h 1/64
U.S. Cl. 117—132                    6 Claims

ABSTRACT OF THE DISCLOSURE

A hard, rigid composite obtained by depositing on fibrous boron a liquid polyimide-forming composition in an inert solvent, drying and curing up to 500° C.

---

This application is a continuation of U.S. application Ser. No. 593,743, filed Nov. 14, 1966, now abandoned.

This invention relates to molded articles which are serviceable at elevated temperatures and more particularly provides new and valuable, light-weight composite structures comprising a polyimide matrix.

In the manufacture of modern aircraft there is need for tough structural materials having little weight and great stability to heat. Generally, molded polymers, alone, do not possess the requisite strength; hence numerous polymers have been used with reinforcing agents such as glass cloth or metal screening in the preparation of composite structures, e.g., laminates, having greater strength than that of the polymer alone. However, thereby the weight of the molded structure is significantly increased. Also, as the thermal stability of polymeric matrix materials increases, bonding of the polymer to the reinforcing agent often becomes inadequate, so that fragmentation or delamination occurs at the polymer/reinforcing agent interface. Even a greater deterrent to the provision of strong composite structures is the propensity of many of the commercially available polymers to attack the reinforcing agent. The deterioration which often results in the inorganic fiber or filament when a matrix is formed around it has been of much concern in the art.

An object of this invention is to provide relatively light weight, molded objects having exceptionally good stability to heat and high flexural strength. Another object is to provide a composite of matrix and reinforcing agent wherein the matrix adheres tenaciously to said agent. Still another object is the provision of shaped, compression-molded laminates possessing extraordinary strength characteristics throughout wide temperature ranges.

These and other objects herein defined are met by the following invention wherein there are provided composite structures comprising essentially fibrous boron and solid polyimide of the formula:

$$\left[ \begin{array}{c} \underset{\underset{O}{\|}}{C} \quad \underset{\underset{O}{\|}}{C} \\ -N \diagdown R \diagup N-Z- \\ \underset{\underset{O}{\|}}{C} \quad \underset{\underset{O}{\|}}{C} \end{array} \right]_n$$

wherein R is a tetravalent aromatic radical of 6 to 24 carbon atoms, is free of olefinic and acetylenic unsaturation and of substituents which react with the amine radical more readily than does the carboxy radical, wherein one pair of the $$-\underset{\underset{}{\overset{O}{\|}}}{C}-$$

groups is positioned at a first pair of non-tertiary, nuclear carbon atoms which are immediately consecutive and wherein the other pair of the $$-\underset{\underset{}{\overset{O}{\|}}}{C}-$$

groups is positioned at a second pair of non-tertiary nuclear carbon atoms which are immediately consecutive, said second pair being separated from said first pair by at least one carbon atom, wherein Z is an aromatic radical having from 6 to 18 carbon atoms and being free of olefinic and acetylenic unsaturation and of substituents which react more readily with the carboxy radical than does the amine radical, and wherein n denotes the degree of polymerization.

Boron fibers or filaments are well known in the art. The properties thereof are described, for example, by Harvey H. Herring in the Report to the National Aeronautics and Space Administration, which is entitled "Selected Mechanical and Physical Properties of Boron Filaments," and identified as NASA–TN–D 3202, January 1966, and also the report by Robert M. Witucki, entitled "Boron Filaments" and available from the Office of Technical Services, Arlington, Va., as publication CR–96. Vapor-phase deposition of boron on a filament of a high melting metal, e.g., tungsten, tantalum, molybdenum, or titanium, is generally employed in the manufacture of the boron filaments; therefore, the filament core is generally a metal or metal boride. Irrespective of the nature of the core, the art usually refers to the filaments as boron filaments and this terminology will be used hereinafter. In the examples which follow, the boron filaments had been produced by vapor deposition of boron on tungsten.

Polyimide resins are described, for example, in U.S. Pats. 2,895,948; 3,174,947; 3,190,856; 3,220,882; 3,234,181; 3,247,165 and British Pats. 903,271–2 (1962); 942,025 (1963) and 980,274 (1965). They are usually prepared by reaction of an aromatic tetracarboxylic acid or an ester or dianhydride thereof with an organic diamine to obtain an intermediate, curable prepolymer wherein there are present amide and/or salt linkages by reaction of an amine group of the diamine with a carboxy group of the tetracarboxylic component, with two carboxy groups of the tetracarboxylic component being unlinked to the organic amine component. Upon heating at elevated temperatures, intramolecular cyclization occurs, with formation of an imide structure. Thus, condensation of, say, 1,2,4,5-benzenetetracarboxylic dianhydride and p-phenylenediamine to give a polymeric amide/acid and curing of the latter to a polyimide proceeds substantially as follows:

$$\underset{\text{benzenetetracarboxylic dianhydride}}{\underset{\underset{O}{\|}}{\overset{\underset{O}{\|}}{C}}\diagup\diagdown\underset{\underset{O}{\|}}{\overset{\underset{O}{\|}}{C}}} + H_2N-\!\!\!\diagup\!\!\!\diagdown\!\!-NH_2 \longrightarrow$$

$$\left[ \begin{array}{c} \underset{H}{\overset{}{\text{N}}}-\underset{\underset{O}{\|}}{C}\diagup\diagdown\underset{\underset{O}{\|}}{C}-\underset{H}{\overset{}{\text{N}}}-\!\!\!\diagup\!\!\!\diagdown\!\!- \\ HO-\underset{\underset{O}{\|}}{C}\diagdown\diagup\underset{\underset{O}{\|}}{C}-OH \end{array} \right]_n \longrightarrow$$

$$\left[ \begin{array}{c} \underset{\underset{O}{\|}}{C}\diagup\diagdown\underset{\underset{O}{\|}}{C} \\ -N \diagdown\diagup N-\!\!\!\diagup\!\!\!\diagdown\!\!- \\ \underset{\underset{O}{\|}}{C}\diagdown\diagup\underset{\underset{O}{\|}}{C} \end{array} \right]_n$$

wherein n denotes the degree of polymerization.

When the free acid or an ester is used instead of the dianhydride, the reaction proceeds similarly, except that water is evolved as a by-product in the case of the free acid and the reaction in the case of the ester proceeds with formation of a polymeric salt/ester:

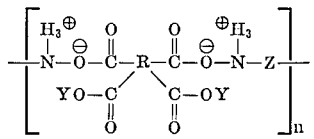

or a polymeric amide/ester

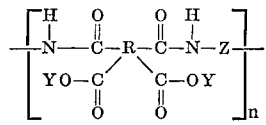

Conversion to the same polyimide takes place upon curing, with liberation of a hydroxy compound corresponding to the alcoholic portion of the diester, i.e., of Y—OH, wherein Y is hydrocarbon, hydroxyalkyl or hydrocarbyloxyhydrocarbyl.

Irrespective of whether the starting tetracarboxy reactant is the dianhydride, the free acid or the diester, there is obtained from the tetracarboxy compound and the diamine a polymeric condensation product which, upon curing, is converted to the same thermally stable polyimide. Therefore, the polymeric salt or amide, containing either the free carboxylic groups or the ester groups will be hereinafter referred to simply as the polyimide-forming prepolymer.

In technical operation, composites are generally prepared by contacting the substrate with a fluid polymer-forming agent to obtain a deposit of said agent on the substrate, and drying and/or heating to give a combination of substrate and polymer which is amenable to shaping or molding. Such a combination is generally referred to in the art as a "prepreg," and the polymerization process by which it is made is usually referred to as B-staging. In the polyimide art, the prepreg or B-staged material comprises the substrate plus the above-referred to polyimide-forming prepolymer. It is converted to the shaped rigid body or composite by subjecting it to compression molding at above the prepolymer-forming temperature.

For preparation of the presently-provided boron-containing composites, we have found that the fluid polymer-forming agent with which the substrate is treated is advantageously a liquid mixture obtained by mixing together the reactants from which the prepolymer is formed. Because, as in the case of a surface coating, the liquid mixture is hardened after it has been deposited on the substrate, said mixture will be hereinafter referred to as a varnish. The invention thus provides a shaped, rigid body obtained by (1) depositing upon a substrate comprising fibrous boron a liquid mixture or varnish which is prepared by mixing together (a) a tetracarboxy compound of the formula

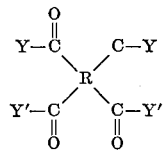

wherein R is a tetravalent aromatic radical of 6 to 24 carbon atoms and is free of aliphatic unsaturation and of substituents which react more readily with the amine radical than does the

group, wherein Y and Y′ when taken singly are selected from the class consisting of —OH, —O— alkyl of from 1 to 8 carbon atoms, —O-aryl of from 6 to 8 carbon atoms, —O-alkylene-OH where alkylene has from 2 to 4 carbon atoms in the chain and a total of from 2 to 8 carbon atoms, and —O-alkylene-O-hydrocarbyl where alkylene is as above defined and hydrocarbyl contains from 1 to 8 carbon atoms and is free of aliphatic unsaturation; wherein Y and Y′, when taken together stand for —O—; and wherein one pair of the radicals

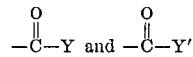

is positioned at a first pair of non-tertiary, nuclear carbon atoms which are immediately consecutive and wherein the other pair of the radicals

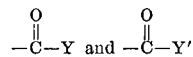

is positioned at a second pair of non-tertiary nuclear carbon atoms which are immediately consecutive, said first pair being separated from the second pair by at least one carbon atom; (b) an aromatic diamine of the formula $$H_2N-Z-NH_2$$

wherein Z is an aromatic radical of from 6 to 18 carbon atoms, is free of aliphatic unsaturation and of substituents which react more readily with a radical containing a

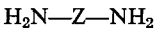

grouping than does the amine group and wherein the two amine radicals are positioned at non-adjacent nuclear carbon atoms; and (c) an inert, organic liquid solvent for said tetracarboxy compound; (2) drying and heating the resulting product at a temperature of up to about 150° C. to give a polyimide-forming prepolymer deposited upon the substrate, and (3) curing the substrate with its deposit at a temperature of up to about 500° C. For fabrication of compression molded articles, the curing is conducted at up to 500° C., and preferably at up to 350° C., and a pressure of from 15 to 5,000 p.s.i.

Compounds of the above formula in which Y and Y′ are —OH are the free aromatic tetracarboxylic acids such as 1,2,4,5-benzenetetracarboxylic acid, 1,4,5,8-naphthalenetetracarboxylic acid, 4-nitro-1,2,5,6-naphthalenetetracarboxylic acid; 2,2′,3,3′-biphenyltetracarboxylic acid, 1,8,9,10-phenanthrenetetracarboxylic acid, etc.

When Y and Y′, taken together, stand for —O—, the compounds are anhydrides; e.g., the tetracarboxy compound may be 3,3′4,4′ - biphenyl 3,4:3′,4 - dianhydride; 4,4′-oxybis(phthalic anhydride); 4,4′-carbonylbis(phthalic anhydride); 3,4,9,10 - perylenetetracarboxylic 3,4:9,10-dianhydride, etc.

The tetracarboxylic compounds may also be diesters of the tetracarboxylic acids with alkanols, phenols, alkylene glycols and the mono-ethers of the alkylene glycols. Thus, there may be used the dialkyl esters, such as the dimethyl, the diethyl, the diisopropyl, the dibutyl or the bis(2-ethylhexyl) esters of any of the above tetracarboxylic acids or of such acids as 4,4′-sulfonylbis(phthalic acid), 2,2-bis (2,3-dicarboxyphenyl)propane or 3,6-dimethoxy-1,2,4,5-benzenetetracarboxylic acid.

Particularly valuable for the present purposes are the liquid mixtures or varnishes which are obtained from the bis(hydroxyalkyl) esters of the tetracarboxylic acids and the aromatic diamines. These are disclosed in the copending application of Ralph E. DeBrunner and John K. Kincke, Ser. No. 581,667, filed July 19, 1966. Also useful are the varnishes obtained from the bis(hydrocarbyoxyalkyl) esters of said tetracarboxylic acids and the aromatic diamines which are described in the copending application of Ralph E. DeBrunner, Ser. No. 561,755, filed June 30, 1966, now abandoned. Examples of the presently useful bis(hydroxyalkyl) or bis(hydrocarbyloxyalkyl) tetracarboxylates are the bis(2-hydroxyethyl), the bis(3-hydroxypropyl), the bis(4-hydroxybutyl), the bis(2-hydroxy-1- methylethyl), the bis(2,3-dimethyl-3-hydroxypropyl), the 2-hydroxyethyl 3-hydroxypropyl, the bis(2-methoxy-, ethoxy-, propoxy-, butoxy-, hexyloxy- or octyloxyethyl), the bis(4-methoxy- or propoxybutyl), bis(4-ethoxy- or methoxypropyl), the bis(2 - ethyl - 2 - methyl-3-pentylpropyl), the bis(2 - phenoxyethyl), the bis(4-phenoxybutyl), the bis(3-o-, m- or p-tolyloxypropyl)-, 2-p-tolyloxyethyl 4-hydroxybutyl, or the bis(3-cyclopentyloxypropyl) esters of the aromatic tetracarboxylic acids, generally, so long as such acids are free of non-benzenoid unsaturation and of substituents which react with an amine radical more readily than dose the carboxy group and so long as the carboxy and carboxylate radicals are positioned as described above, such as 1,2,4,5-benzenetetracarboxylic acid; 1,4,5,8 - naphthalenetetracarboxylic acid; 4-nitro - 1,2,5,6 - naphthalenetetracarboxylic acid; 3,3',4,4' - biphenyltetracarboxylic acid; 2,2'-dimethoxy-3,3' - 4,4' - biphenyltetracarboxylic acid, 2,2'3,3' - biphenyltetracarboxylic acid; 3,6 - dimethoxy - 1,2,4,5-benzenetetracarboxylic acid; 2,2',5,5' - tetramethyl - 3,3',4,4'-biphenyltetracarboxylic acid; 3,4,9,10 - perylenetetracarboxylic acid; 4,4' - isopropylidenediphthalic acid; 1,8,9,10-phenanthrenetetracarboxylic acid; 4,4' - carbonyldiphthalic acid; 4,4' - [2,2,2 - trifluoro-1-(trifluoromethyl)]ethylidenediphthalic acid; 4,4'-oxydiphthalic acid; 4,4'-sulfonyldiphthalic acid; 2,2' - dichloro - 3,3',4,4'-biphenyltetracarboxylic acid; etc. Presently preferred are the bis(hydroxyalkyl) and the bis(hydrocarbyloxyalkyl) esters of 4,4'-carbonyldiphthalic acid; i.e., compounds of the structure

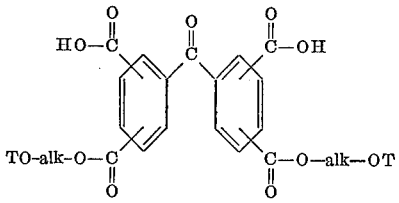

wherein T is H or hydrocarbyl.

An ester of two or more different hydroxy compounds and the aromatic tetracarboxylic acid may be used, e.g., there may be employed mixed esters obtained by esterifying one of the four carboxylic groups with one glycol or one hydroxy ether and then esterifying another carboxylic group with a different glycol or hydroxy ether or by esterifying one of the carboxylic groups with a glycol and the other with a hydroxy ether.

The aromatic diamine with which the free tetracarboxylic acid, the dianhydride or the diester thereof is used may be any aromatic diamine which has from 6 to 18 carbon atoms and which is free of aliphatic unsaturation and of substituents which react with the carboxy radical more readily than does the amine radical, e.g., 4,4'-oxydianiline, o-, m- or p-phenylenediamine, benzidine, 3,3'-dimethoxybenzidine, 1,8-naphthalenediamine, 4,4'-sulfonyloxydianiline, 4,4'-methylenedianiline, 4,4'-methylene-bis (3-nitroaniline), 4,4' - ethylidenedianiline, 2,3,5,6-tetramethyl-p-phenylenediamine, 4,4' - oxybis(2,2'-propylaniline), etc.

Two or more different diamines or two or more different tetracarboxy compounds may be used as the respective amine and carboxylic reactants; e.g., a mixture of an amine such as benzidine and 4,4'-oxydianiline or p-phenylenediamine and 1,8-naphthalenediamine may be used with a single carboxylic component such as bis(2-hydroxyethyl) or bis(2-ethoxyethyl) 1,2,4,5-benzenetetracarboxylate or bis(3-hydroxypropyl) or bis(4-hydroxybutyl) 4,4'-carbonyldiphthalate or with a mixture of carboxylates such as a mixture of bis(3-propoxybutyl) 4,4'-isopropylidenediphthalate and bis(2 - methoxyethyl) 3,4,9,10-perylenetetracarboxylate or a mixture of bis(2-hydroxyethyl) 4,4'-carbonyldiphthalate and bis(2,3 - dimethyl-4-phenoxybutyl) 4,4'-carbonyldiphthalate. Thereby there are obtained in the prepreg and in the molded composite polymers having different linkages dispersed more or less randomly in the polymer molecule. Such an expedient is useful in providing for polymer structures having properties intermediate to those attributable to the individual linkages.

Advantageously, the bis(hydroxyalkyl) or bis(hydrocarbyloxyalkyl) esters which are mixed with the diamine in preparing the varnishes are obtained by reacting an appropriate aromatic tetracarboxylic acid or the dianhydride thereof with an appropriate alkylene glycol or mono-ether thereof. Even though an excess of the said glycol or mono-ether is used, complete esterification is not obtained. However, the excess does serve as a convenient and very efficient solvent for the esterification and in the varnish.

Preparation of the presently useful varnishes is carried out by mixing together the diamine, the tetracarboxy compound and a solvent for the latter. Because the bis (hydroxyalkyl) and the bis(hydrocarbyloxyalkyl) esters are readily soluble, provision of a solvent for this purpose presents no problem when these esters are used as the tetracarboxy component. If an excess of the alkylene glycol or of the mono-ether thereof has been employed for esterifying the tetracarboxylic acid or dianhydride in preparing the bis-ester, the excess can conveniently serve as solvent in the varnish. Also, if desired, to any excess of the glycol or ether which is present in the esterification product, there may be added one or more other solvents, e.g., a lower alcohol or ether such as butanol or propyl ether. When the tetracarboxy component is the free acid or the dianhydride or the dialkyl ester, solubilization may require the use of such solvents as dimethylformamide or N-methylpyrrolidone. Generally, when the diamine is mixed with the tetracarboxy component in a solvent therefor, little or no evolution of heat is noted and a clear solution or varnish results.

The above varnishes are used according to this invention, in conjunction with a reinforcing agent consisting essentially of boron in fibrous or filament form. Although boron is highly reactive and is susceptible to attack by numerous chemical compounds, including many of the commercially available materials, we have found that the polyimide-forming varnishes are advantageously employed with boron fibers or filaments to give light-weight, rigid composites of very good flexual strength and resistance to heat. This is surprising because in prior art use of inorganic fibrous reinforcing agents, it has often been necessary to provide for separating the inorganic fiber from the polymeric matrix, e.g., by employing an intermediate layer of an inert material between the fiber and the matrix, by coating the inorganic fiber for protection against the destructive action of the matrix, etc. In the present instance, there appears to be no degradation of the boron fiber or filament during composite fabrication; and, although interaction of a kind may occur between boron and the polyimide or its precursors, such interaction, if any, results in a beneficial effect which is exhibited by increased strength characteristics.

The boron fibers or filaments may be the only reinforcing materials of the presently provided composite structures or they may be employed in conjunction with other fibrous reinforcing agents. When used alone, the boron fibers are simply contacted with the varnish, dried, and compress molded to a shaped, rigid composite. The boron may be in filament, mat, or woven form. Owing to the fact that boron filaments are generally produced in short lengths, and because they are not readily amendable to spinning, bundles of filaments for use in weaving are produced by sheathing or packaging a number of boron fibers with more flexible material; for example, nylon or polyester filament may be wound or braided around a bundle of, say, from 2 to 15 filaments of boron to give a continuous thread-like body. This may then be used as a warp end and woven into cloth for use with the present polyimide-forming varnish in fabrication of a laminate structure. Although thereby is attained a light, rigid structure which is strong enough for numerous applications, the presence of the polymeric sheath—even though it is present in a relatively insignificant amount based on the total weight of the laminate—may not be conducive to optimum thermal resistance and strength properties. This effect can be nullified by removing the sheathing from the boron after weaving and before impregnation with the varnish, e.g., by soaking the woven material in a solvent for the sheathing.

Either the sheathed or unsheathed boron filament may be used with other reinforcing agents, e.g., glass, carbon, silica, silicon carbide or boron nitride fibers or filaments. Thus, the boron may be used as the warp in weaving, employing glass fiber as the fill. Or, a laminate structure may be prepared by positioning loose boron fiber upon a ply of glass cloth, covering this with another ply of the glass cloth and proceeding to form a structure having alternating layers of boron fiber and glass cloth. There may thus be formed laminates having from 3 to, say, as many as 30 plies. Only a few layers of the boron fiber may be used with a plurality of glass cloth plies, because the insertion of, say, only one layer of boron at the top and bottom of a laminate structure has a significant effect on obtaining maximum strength and thermal properties with a minimum of weight. The manner in which the boron is used and the quantity thereof in the final composite may thus be widely varied, the salient feature of the invention being the presence of fibrous boron as a reinforcing agent in a composite wheren the matrix is a polyimide.

The invention thus provides a method of preparing a composite structure comprising fibrous boron as a reinforcing agent and a polyimide as the matrix which comprises forming a polyimide-forming varnish by mixing together the aforesaid aromatic diamine and the aforesaid tetracarboxy compound in an inert, liquid organic solvent for the latter, applying the varnish to a substrate comprising fibrous boron, drying and heating the resulting substrate to a temperature of up to 150° C. to obtain a prepreg comprising the substrate having deposited thereon a solid, polyimide-forming prepolymer, including the prepreg as a ply in a laminate structure and curing the structure by heating it at from about 150° C. up to about 500 C. to obtain a hard, rigid unit.

In the preparation of a laminate from a boron fiber cloth prepreg, strips of the cloth are respectively impregnated, e.g., by dipping into the varnish or by liberally brushing with the varnish. The varnishes which are prepared from either the bis(hydroxyalkyl) or the bis(hydrocarbyloxyalkyl) esters of the tetracarboxylic acids are more readily soluble than those prepared from either the dialkyl esters or the free acid or the dianhydride; accordingly, such varnishes are preferred because their use permits easy clean-up of the dipping tanks, brushes, drying racks and any other processing equipment. Advantageously the impregnated cloth is drained and conversion to the uncured, polyimide-forming prepolymer, i.e., B-staging is conducted by maintaining the drained cloth in a circulating air oven at a temperature which is below the temperature at which the prepolymer is cured to the polyimide, i.e., at a temperature of, say, above about 80° C. but below 150° C. Plies made of the B-staged or prepregged material are then stacked to a laminate structure, employing one or more plies of the boron prepregs with the glass prepregs.

Curing of the stacked laminate structure, whether it consists of plies of only the boron prepreg or of both the boron prepreg and the glass prepreg, is conducted by compression molding at a temperature of 150° C. up to about 500° C., and preferably of up to about 350° C., at a pressure of, say, from about 10 p.s.i. to 10,000 p.s.i. to obtain a shaped, smooth-surfaced, rigid unit. The curing may be conducted in air or in an inert atmosphere which may be e.g., nitrogen, argon, or vacuum. The curing temperature will depend upon such conditions as time and atmosphere, upon the number of plies, etc.

Plies of the boron prepreg are thus tenaciously bonded to each other or to the glass cloth prepeg. Other composites may be similarly prepared, employing instead of the glass prepreg, plies made of similarly B-staged fabric which has been woven from silica, graphite or metal filaments. Finely comminuted reinforcing materials or fillers, which may be in microballoon form, may be incorporated with the varnish previous to prepregging.

Although the invention is particularly valuable for the manuftcture of laminate composites, it is of general applicability for preparation of light-weight composite structures, generally, including baked coatings and cast objects. Thus, the polyimide-forming varnish may be concentrated to a thick, viscous liquid and mixed with the fibrous boron to form a mobile mass which can be formed while heating to the curing temperature or which can be trowelled or otherwise applied to, say, a metal surface for coating thereof. Subsequent baking of the metal with its deposit gives a light-weight, tenaciously held coating of very good thermal stability.

The invention if further illustrated by, but not limited to, the following examples.

EXAMPLE 1

A solution of 322.2 g. (1.0 mole) of 4,4'-carbonyldiphthalic anhydride in 510.2 g. (ca. 8.2 moles) of ethylene glycol was slowly warmed to 130° C. The resulting reaction mixture, comprising the bis(2 - hydroxyethyl) ester of 4,4'-carbonyldiphthalic acid dissolved in ethylene glycol, was allowed to cool to 40° C. It was then mixed with 108.1 g. (1.0 mole) of m-phenylenediamine, and the whole was stirred for 30 minutes without application heat. The resulting mixture, having a solids content of of 60%, will be hereinafter referred to as a varnish.

Glass cloth, B-staged prepregs having a resin content of 34.5% and a volatiles content of 8.5% were prepared by impregnating glass cloth (S–994 glass, 181 style, heat cleaned) with the above varnish, draining it and then maintaining it in a forced draft air oven for 30 minutes at 120° C.

The following laminate assemblies were prepared:

(I) A 13-ply stack of 4″ squares of the above glass cloth prepreg.

(II) A stack consisting of 13 plies of 4″ squares of the above glass cloth prepreg having positioned between the bottom glass cloth ply and the next adjacent glass cloth ply a first layer of boron filaments and a second layer of boron filaments positioned between the top glass cloth ply and the next adjacent glass cloth ply. The two layers of boron each consisted of boron filaments having a diameter of 4.5 mils which had been made by vapor deposition of boron on a 0.5 mil tungsten filament. The boron filaments were laid on the glass prepreg surface in the warp direction so as to give 160 filaments per inch along one dimension of the square. The weight of the boron filament was calculated to be an average of .00212 g. per 4″ long section.

Each of the above type laminates was pressed for 45 minutes at 260° C. (500° F.) and 50 p.s.i. The resin flow-out for both types was 17.4%. The resin content of the pressed type I laminate was determined to be 20.8%; that of type II was 21.1%. The following strength data were determined at room temperature:

| Laminate type | Flexural strength, p.s.i. | Flexural modulus, p.s.i. |
| --- | --- | --- |
| I | 88,000 | 3,800,000 |
| II | 98,000 | 5,100,000 |

The above data show significant increase in strength and rigidity owing to the presence of the boron fiber in the laminates.

EXAMPLE 2

The varnish described in Example 1 was used as follows in laminate manufacture.

B-staged, impregnated glass cloth stock was prepared by dipping panels of commercial glass fiber textile (S–994 glass, 181 style, heat-cleaned) into the varnish, draining them, and maintaining them on racks in a forced draft air oven at 120° C. (248° F.) for 90 minutes. There were thus obtained glass cloth prepregs having a resin content of 33.3% and a volatiles content of 4.5%.

B-staged boron fibers extile was prepared from a woven material which was made as follows: 20-denier nylon filament was braided around a bundle of 7 strands of the boron filament of Example 1 to give a cord having a nylon content of about 7%, and this was used as the warp with a nylon woof or fill in weaving an 0.5" wide tape. The tape was cut into 4" lengths, and a batch of the resulting pieces cold-dipped into a portion of the above-described varnish, allowed to drip, and B-staged by heating them in the oven for 30 minutes at 120° C. There were thus obtained pieces of boron tape prepreg having a resin content of 37.5%. These pieces will be hereinafter identified as boron prepregs No. 1. Another batch of 4" pieces of the same boron tape were cold-dipped in another portion of the same varnish and B-staged as above after a shorter dripping time. The prepregs thus obtained had a resin content of 50.2%; hereinafter they will be referred to as boron prepregs No. 2. A third batch of the tapes was cold, vacuum dipped for 30 minutes in another portion of the varnish and allowed to drip; B-staging for 30 minutes gave pieces having a resin content of 41.4%; this will be hereinafter referred to as boron prepreg No. 3. Repeating this last preparation but employing a slightly longer dripping time gave boron prepregs No. 4, having a resin content of 38.1%.

A laminate assembly was obtained by arranging pieces of the boron prepreg No. 1 on a 4" square of the above-prepared glass cloth prepreg to cover completely the upper surface of the glass cloth, then stacking 8 plies of the 4" squares of glass cloth prepregs on the arrangement of boron prepreg, covering the top surface of the uppermost glass prepreg with the pieces of boron prepreg No. 2, and finally placing a 4" square of the glass cloth on top of the layer of said pieces of boron prepreg No. 2. The resulting stacked arrangement will be hereinafter referred to as laminate assembly 1–2. Another stacked arrangement was similarly prepared using pieces of boron prepreg No. 3 instead of No. 1 and pieces of boron prepreg No. 4 instead of No. 2; the stacked arrangement thus obtained will be hereinafter referred to as laminate assembly 3–4.

After weighing the two assemblies, they were respectively pressed for 1 hour at 260° C. (500° F.) and 100 p.s.i., and then re-weighed. The difference between the original weight and that of the pressed products represents flow-out of the varnish. Flow-out values of 15.0% and 13.1% were thus determined for the pressed laminates 1–2 and 3–4, respectively. The quantity of resin in a pressed laminate is determined by subtracting the total weight of the bare glass cloth and the bare boron tape from the weight of the laminate after pressing. A resin content of 28.1% and of 25.0% was thus determined for laminate 1–2 and for laminate 3–4, respectively. The smooth laminates 1–2 and 3–4, having a matrix of polyimide resin, had thicknesses of 0.112" and 0.113" and Barcol hardness values of 55–66 and 5–7, respectively. The flexural strength and the flexural modulus of laminate 3–4 determined at room temperature, were 77,600 p.s.i. and 11.2 million p.s.i., respectively. Laminate 1–2 was post-cured by heating it for 2-hour periods at each of the following temperatures: 200, 225, 250, 300, 325 and 350° C. and for 4 hours at 372° C. The post-cured laminate had a flexural strength of 52,600 p.s.i. at room temperature and a modulus of 14.3 million p.s.i. at the same temperature.

EXAMPLE 3

Nylon filament (20 denier) was braided around a bundle of 7 strands of boron fiber as described in Example 2, and this was used as the warp with woof or fill of fiber glass (SCG–150–1/2), employing 240 warp ends, to weave a 2.7" tape having, by weight, a boron fiber content of 90.81%, a nylon content of 7.73% and a glass content of 1.4%.

The following prepregs were prepared, employing the varnish described in Example 1.

(A) Glass fiber textile (S–994 glass, 181 style, heat-cleaned), impregnated with the varnish and B-staged for 90 minutes at 120° C. to give a prepreg having a resin content of 32.7% by weight.

(B) The above-described boron-containing, 2.7" wide tape, impregnated with the varnish and B-staged to give a prepreg having a resin content of 36.6%.

The B-staged glass fiber cloth was cut into 3" x 4" pieces (warp: 4") and the B-staged boron-containing tape was cut into 4" lengths. A laminate structure was prepared by positioning of the boron tape lengthwise on top of a piece of the glass cloth so that the 2.7" width of the boron tape was centrally positioned at the 3" width of the glass cloth, then stacking 9 plies of the glass cloth on top of the boron tape, positioning a second piece of the boron tape on top of the 9 plies of glass cloth, and finally placing a ply of the glass cloth on top of the boron tape. There were thus prepared a number of 3" x 4", 13-ply laminate assemblies. These were cured for 3 minutes at 260° C. (500° F.) at 40 p.s.i. and for 57 minutes at the same temperature but at a pressure of 100 p.s.i. Four of the light tan, smooth-surfaced laminates were then post-cured for 2-hour periods at each of the following temperatures: 200, 225, 250, 300, 325 and 350° C., and then tested at room temperature for strength characteristics; an average flexural strength of about 86,000 p.s.i. and an average flexural modulus of about 9,300,000 were thus obtained.

Post-curing of eight of the laminates was conducted in the same manner through the 350° C. 2-hour period; however, subsequently they were heated for 4 hours at 372° C. (700° F.). The average flexural strength and modulus values, determined at room temperature, for four of these post-cured laminates was found to be about 86,000 p.s.i. and 10,500,000 p.s.i., respectively. Hence, heating at 372° C. for the 4-hour period has substantially no effect. However, when the other four of these eight laminates were heated for 100 hours at 372° C. and the strength characteristics were determined at this temperature, there was observed a notable decrease: the average value for flexural strength was only about 9,500 p.s.i. and the average value for flexural modulus had decreased to about 3,100,000 p.s.i.

EXAMPLE 4

In order to ascertain whether the nylon content of the laminates of Example 3 was responsible for lack of thermal stability upon long heating, the boron tape of Example 3 was treated as follows for removal of the nylon: The tape was cut into 4.5" long pieces, the raw ends were immersed in molten polyethylene to seal them, and the thus-treated pieces were immersed in 97%–100% formic acid for about 2 hours with occasional agitation. The formic acid was then decanted and replaced with fresh acid and soaking was continued for about another 3 hours. The pieces of tape were then removed, washed thoroughly with tap water, dried on paper towels, and stored over calcium sulfate.

Five pieces of the thus-treated tape were then thoroughly impregnated with the varnish described in Example 1 by immersing them in the varnish and the impregnated specimens were B-staged by heating them for 45 minutes while suspended in a horizontal position. The ends of each piece were then trimmed to give 4" long specimens, and any remaining polyethylene was scraped off. The B-staged pieces, having a resin content of 24.3%, were then stacked to give a 5-ply laminate assembly. Curing of the assembly for 3 minutes at 260° C. (500° F.) at 40 p.s.i. and then at the same temperature for 57 minutes at 100 p.s.i. gave a smooth, well-bonded laminate having a boron fiber content of 81.14% by weight and 71.7% by volume. The laminate was post-cured by heating it for 2-hour periods at each of the following temperatures: 200, 225, 250, 300, 325, and 350° C. and for 4 hours at 372° C. Four test specimens, 0.5" x 4.0", were then cut from the laminate. Two were used for flexural strength and the flexural modulus evaluation at room temperature; average values of 54,000 p.s.i. and 10,600,000 p.s.i., respectively, were thus determined. The other two were tested for heat stability by heating them for 100 hours at a temperature of 372° C. (700° F.). The thus-treated specimens were found to have a flexural strength of 62,300 p.s.i. and a flexural modulus of 13,700,000 p.s.i. (average of the two). The very good values point to the detrimental effect of the nylon, insofar as long exposure to high temperature is concerned. The increase in strength properties also indicates a beneficial effect of the boron on the aging characteristic of the polyimide matrix.

EXAMPLE 5

Five 4.5" lengths of the boron tape described in Example 4 were treated to remove the nylon and impregnated as described in Example 4 using the varnish which had been employed in that example and the same drying procedure. The impregnated strips were B-staged by maintaining them in a forced draft oven for 1 hour at 120° C. The strips were then trimmed at each end to give 4" lengths and weighed for determination of resin content. The average resin content of the five B-staged specimens was thus found to be 39%. The five strips were then stacked upon each other unidirectionally to give a 5-ply laminate assembly and cured for 3 minutes at 260° C. (500° F.) and 40 p.s.i., and then for 57 minutes at the same temperature but at a pressure of 100 p.s.i. The resulting smooth, well-bonded laminate, having a boron content of 73.0% by weight and 60.8% by volume, was post-cured by heating for 2-hour periods at each of the temperatures: 200°, 225°, 250°, 300°, 325° and 350° C. and for 4 hours at 372° C. Test specimens (0.5" x 4.0") cut from the post-cured laminate were found to have a flexural strength of 86,100 p.s.i. and a flexural modulus of 19,700,000 p.s.i. (at room temperature, average for two specimens).

EXAMPLE 6

A mixture consisting of 322.2 g. (1 mole) of 4,4'-carbonyldiphthalic anhydride and 476.3 g. (6.3 moles) of 2-methoxyethanol was gradually heated, with stirring, to about 120° C., and stirring at this temperature was continued for 0.5 hour after all of the solids had dissolved. The resulting reaction mixture, comprising a solution of bis(2-methoxyethyl) 4,4'-carbonyldiphthalate in 2-methoxythanol, was allowed to cool to 40° C., and 108.1 g. of m-phenylenediamine was added thereto. The whole was then stirred for 1 hour to give a clear varnish having a solids content of 63.1% in 2-methoxyethanol. Use of the varnish for impregnating the boron/glass tape (nylon removed) of Example 4, with B-staging and laminate assembly and curing being conducted as in that example, gave a strong, well-bonded laminate having very good flexural strength and modulus upon subsequent aging at 372° C. for 100 hours.

EXAMPLE 7

To 740.7 g. (5.4 moles) of β-phenoxyethanol there was slowly added, with stirring, 322.2 g. (1 mole) of 4,4'-carbonyldiphthalic anhydride. The resulting mixture was heated to 110° C. and stirred until all solids were dissolved. The resulting reaction mixture, comprising a solution of bis(2-phenoxyethyl) 4,4'-carbonyldiphthalate in 2-phenoxyethanol, was cooled to 40° C., 108.1 g. (1 mole) of m-phenylenediamine was added thereto, and the whole was stirred for about 2 hours to dissolve all of the solids. During this time, a 19° C. increase in the temperature of the reaction mixture was noted, indicating some reaction of the bis(2-phenoxyethyl) ester with the diamine.

The solution, having a solids content of 60%, was used for impregnating the boron/glass tape (nylon removed) of Example 4, with B-staging, laminate assembly and curing being conducted as in that example, to give a smooth-surfaced, tough laminate.

EXAMPLE 8

The 2.7" boron tape of Example 3 was treated as follows to remove the nylon sheathing: 4.5" lengths of the tape were immersed for 2.5 hours in 97–100% formic acid, washed first with flowing water for 20 minutes and then with absolute ethanol, blotted dry, and finally dried overnight in a desiccator.

A varnish having a solids content of 60% was prepared by slowly warming to 130° C. a mixture of 1 mole of 4,4'-carbonyldiphthalic anhydride with about 8 moles of butanol, cooling to 40° C. and then stirring the resulting dibutyl ester with m-phenylenediamine.

The dried pieces of tape from which the nylon had been removed were immersed in the varnish for 4 hours, drained and B-staged for 30 minutes at 120° C. to obtain prepregs having a resin content of 17.0%. Both ends of the prepregs were trimmed to give a 4" length and a 5-ply assembly of the trimmed prepregs was laid up for laminating. Pressing for 2 minutes at 500° F. and 40 p.s.i. and for 58 minutes at 500° F. and 100 p.s.i. gave well-bonded laminates having a thickness of 0.055–0.058", a resin content of 8%, an average flexural strength value of 55,700 p.s.i. and a flexural modulus of 21.2 million p.s.i. (average for 5 test specimens).

Although, for purposes of comparison, the above examples are limited to varnishes prepared from the 2-hydroxyethyl, or the 2-methoxyethyl, or the 2-phenoxyethyl or the dibutyl ester of 4,4'-dicarbonylphthalic acid as the ester component and to m-phenylenediamine as the organic amine component of the polyimide-forming varnishes, other esters of the tetracarboxylic acids and other diamines are likewise useful; thus, there may be employed the diethyl, the di-phenyl, the bis(3-propoxypropyl) or the bis(3- or 4-phenoxybutyl) ester of 4,4'-carbonyldiphthalic acid or 1,2,4,5-benzenetetracarboxylic acid or of other tetracarboxylic acids, e.g., 4,4'-isopropylidenediphthalic acid or 2,3,6,7-naphthalenetetracarboxylic acid and instead of the m-phenylenediamine there may be used benzidine or 1,8-naphthalenediamine or 4,4'-oxydianiline or 4,4'-sulfonyldianiline. Instead of the esters, the free tetracarboxylic acids or their dianhydrides may be used. When using the esters, the solvent need not be the hydroxy compound from which the ester is formed. For example, instead of employing an excess of ethylene glycol for preparing the bis(2-hydroxyethyl) ester of 4,4'-carbonyldiphthalic acid as in the above examples, the ester may be prepared by employing in the reaction mixture only the stoichiometrically required quantity of the ethylene glycol in the presence or absence of an inert, organic liquid diluent. Subsequently, for the prepolymer and polyimide-forming reactions, when an excess of the ethylene glycol has not been used in forming the ester, there may be used such diluents as the lower alcohols.

Obviously, many modifications and variations of the invention may be made without departing from the spirit and scope thereof, and therefore only such limitations should be imposed as are indicated in the appended claims.

What is claimed is:

1. The method of making a hard rigid, composite unit which comprises (a) depositing upon a substrate comprising fibrous boron a liquid mixture or varnish which is prepared by mixing together (I) a tetracarboxy compound of the formula

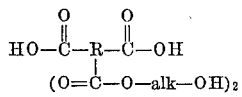

wherein R is a tetravalent aromatic radical of from 6 to 24 carbon atoms, is free of olefinic and acetylenic unsaturation and of substituents which react more readily with the amine radical than does the

group, and wherein one pair of the radicals

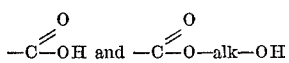

is positioned at a first pair of non-tertiary nuclear carbon atoms which are immediately consecutive and wherein the other pair of the radicals

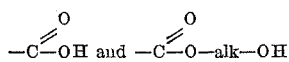

is positioned at a second pair of non-tertiary nuclear carbon atoms which are immediately consecutive, said second pair being separated from said first pair by at least one carbon atom, and alk denotes an alkylene radical having from 2 to 4 carbon atoms in the chain and a total of from 2 to 8 carbon atoms;

(II) an inert organic liquid solvent for the tetracarboxy compound and (III) a diamine of the formula $H_2N-Z-NH_2$ wherein Z is an aromatic radical having from 6 to 18 carbon atoms, is free of aliphatic unsaturation and of substituents which react more readily with a radical containing the

grouping than does the amine radical, and wherein the two amine radicals are positioned at nonadjacent nuclear carbon atoms, (b) drying and heating the resulting product at a temperature of up to 150° C. to obtain conversion of the varnish content thereof to a polyimide-forming prepolymer deposited upon the substrate, and curing the substrate with its deposit at a temperature of up to about 500° C. to obtain a laminate comprising a polyimide matrix.

2. The method defined in claim 1, where alk is —$CH_2CH_2$—.

3. The method defined in claim 1, where R is

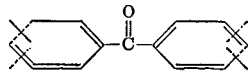

4. The method defined in claim 1, further limited in that Z is phenylene.

5. The method defined in claim 1, further limited in that alk is —$CH_2CH_2$—, R is

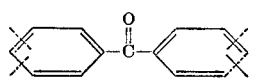

and Z is phenylene.

6. The method defined in claim 1 further limited in that the solvent is ethylene glycol.

References Cited

UNITED STATES PATENTS

| | | | |
|---|---|---|---|
| 3,391,120 | 7/1968 | Fritz | 260—63 |
| 3,326,851 | 6/1967 | Tocker | 260—47 |
| 3,288,842 | 11/1966 | Verdol | 260—475 |
| 3,037,966 | 6/1962 | Chow et al. | 260—78 |

OTHER REFERENCES

Rosato and Grove, Filament Winding, 1964, pp. 64–66.

ROBERT F. BURNETT, Primary Examiner

M. A. LITMAN, Assistant Examiner

U.S. Cl. X.R.

161—92, 170, 214